United States Patent
Sangu

(10) Patent No.: US 10,180,567 B2
(45) Date of Patent: Jan. 15, 2019

(54) OPTICAL MODULATOR ELEMENT, IMAGING APPARATUS, IMAGE PROJECTING APPARATUS

(71) Applicant: Suguru Sangu, Sendai (JP)

(72) Inventor: Suguru Sangu, Sendai (JP)

(73) Assignee: RICOH COMPANY, LTD., Tokyo (JP)

( * ) Notice: Subject to any disclaimer, the term of this patent is extended or adjusted under 35 U.S.C. 154(b) by 454 days.

(21) Appl. No.: 14/643,722

(22) Filed: Mar. 10, 2015

(65) Prior Publication Data

US 2015/0260982 A1 Sep. 17, 2015

(30) Foreign Application Priority Data

Mar. 12, 2014 (JP) .................. 2014-049061
Feb. 27, 2015 (JP) .................. 2015-038866

(51) Int. Cl.
G02B 26/08 (2006.01)
G02B 26/00 (2006.01)
G02F 1/29 (2006.01)
H04N 9/31 (2006.01)

(52) U.S. Cl.
CPC ......... *G02B 26/005* (2013.01); *H04N 9/3105* (2013.01)

(58) Field of Classification Search
USPC ....... 359/290, 291, 292, 295, 298, 237, 250, 359/251, 252, 253, 259, 272
See application file for complete search history.

(56) References Cited

U.S. PATENT DOCUMENTS

| | | | |
|---|---|---|---|
| 6,915,679 B2 * | 7/2005 | Chien | B01L 3/502715 422/50 |
| 8,129,701 B2 * | 3/2012 | Al-Sadah | A61N 5/1042 250/491.1 |
| 2005/0247558 A1 * | 11/2005 | Anex | A61M 5/14248 204/275.1 |
| 2006/0262398 A1 | 11/2006 | Sangu et al. | |
| 2009/0020179 A1 * | 1/2009 | Rosse | G21C 9/004 138/30 |
| 2010/0061218 A1 | 3/2010 | Miura et al. | |
| 2012/0235027 A1 | 9/2012 | Sangu et al. | |

FOREIGN PATENT DOCUMENTS

| | | |
|---|---|---|
| JP | 2005-275162 | 10/2005 |
| JP | 2010-282103 | 12/2010 |
| JP | 2013-037210 | 2/2013 |
| JP | 2013-073976 | 4/2013 |

\* cited by examiner

*Primary Examiner* — Brandi Thomas
(74) *Attorney, Agent, or Firm* — Oblon, McClelland, Maier & Neustadt, L.L.P.

(57) ABSTRACT

An optical modulator element includes a plurality of hole structure, a first liquid reservoir that stores a liquid to be propelled into the plurality of hole structure, a plurality of second liquid reservoirs that store the liquid to be propelled into the plurality of hole structure, and a movement control part that is arranged at at least one end of the second liquid reservoir that is closest to the first liquid reservoir and controls a movement of the liquid from the first liquid reservoir.

9 Claims, 9 Drawing Sheets

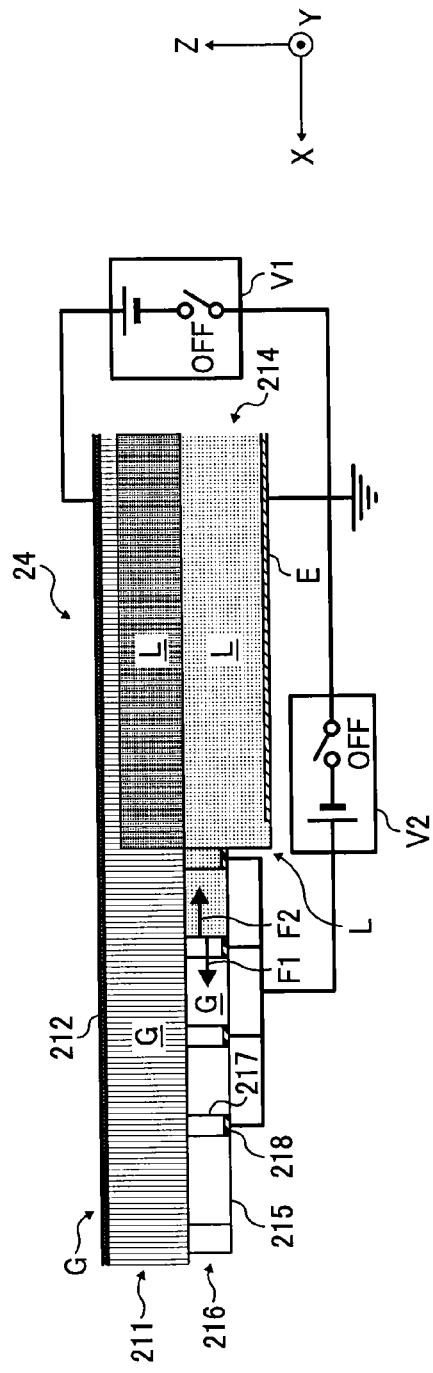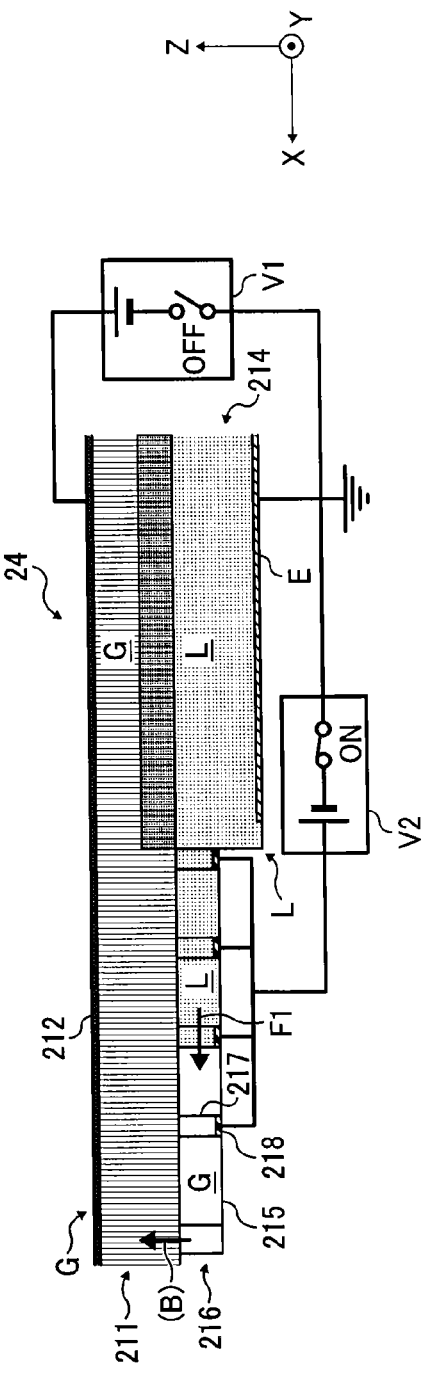

OPTICAL MODULATOR ELEMENT, IMAGING APPARATUS, IMAGE PROJECTING APPARATUS

CROSS-REFERENCE TO RELATED APPLICATIONS

The present application is based upon and claims the benefit of priority from Japanese Patent Application Number 2014-049061, filed Mar. 12, 2014, and Japanese Patent Application Number 2015-038866, filed Feb. 27, 2015, the disclosures of which are hereby incorporated by reference in their entirety.

FIELD OF THE INVENTION

The present invention relates to an optical modulator element, an imaging apparatus, and an image projecting apparatus using an electro-wetting effect.

BACKGROUND OF THE INVENTION

Optical modulator elements of spatial optical modulators may be applied in a wide range of optical fields (e.g., an imaging apparatus such as a camera, an image projecting apparatus such as a projector, an optically measuring technology using a computer hologram, and forming a wavefront of laser beam).

For example, an optical modulator element which has a transparent support member and a liquid whose refractive index is matched to the transparent support member is known. The liquid penetrates into the transparent support member. The optical modulator element controls a refractive index by controlling wettability between the transparent support member and the liquid electrically using an electro-wetting effect. This technology is shown in G. Beni, S. Hackwood, "AppL. Phys. Lett. Vol. 38. Issue 4 (1981, pp. 207-209)" and Japanese Patent Application Publication Nos. 2010-282103, 2005-275162, 2013-073976, and 2013-037210, for example.

However, such an optical modulator element using an electro-wetting effect has difficulty in controlling an interface position of the liquid at multiple values though this optical modulator element which can obtain a higher aperture ratio in comparison to a transmission type optical modulator element using a liquid crystal element.

SUMMARY OF THE INVENTION

According to one embodiment, an optical modulator element may include a plurality of hole structures, a first liquid reservoir that stores a liquid to be propelled into the plurality of hole structures, a plurality of second liquid reservoirs that store the liquid to be propelled into the plurality of hole structures, and a movement control part that is arranged at at least one end of the second liquid reservoir that is closest to the first liquid reservoir and controls a movement of the liquid from the first liquid reservoir.

BRIEF DESCRIPTION OF THE DRAWINGS

FIGS. 4A-4D illustrate schematic diagrams showing an operation of an optical modulator element according to an embodiment.

DETAILED DESCRIPTION

Figure 1:
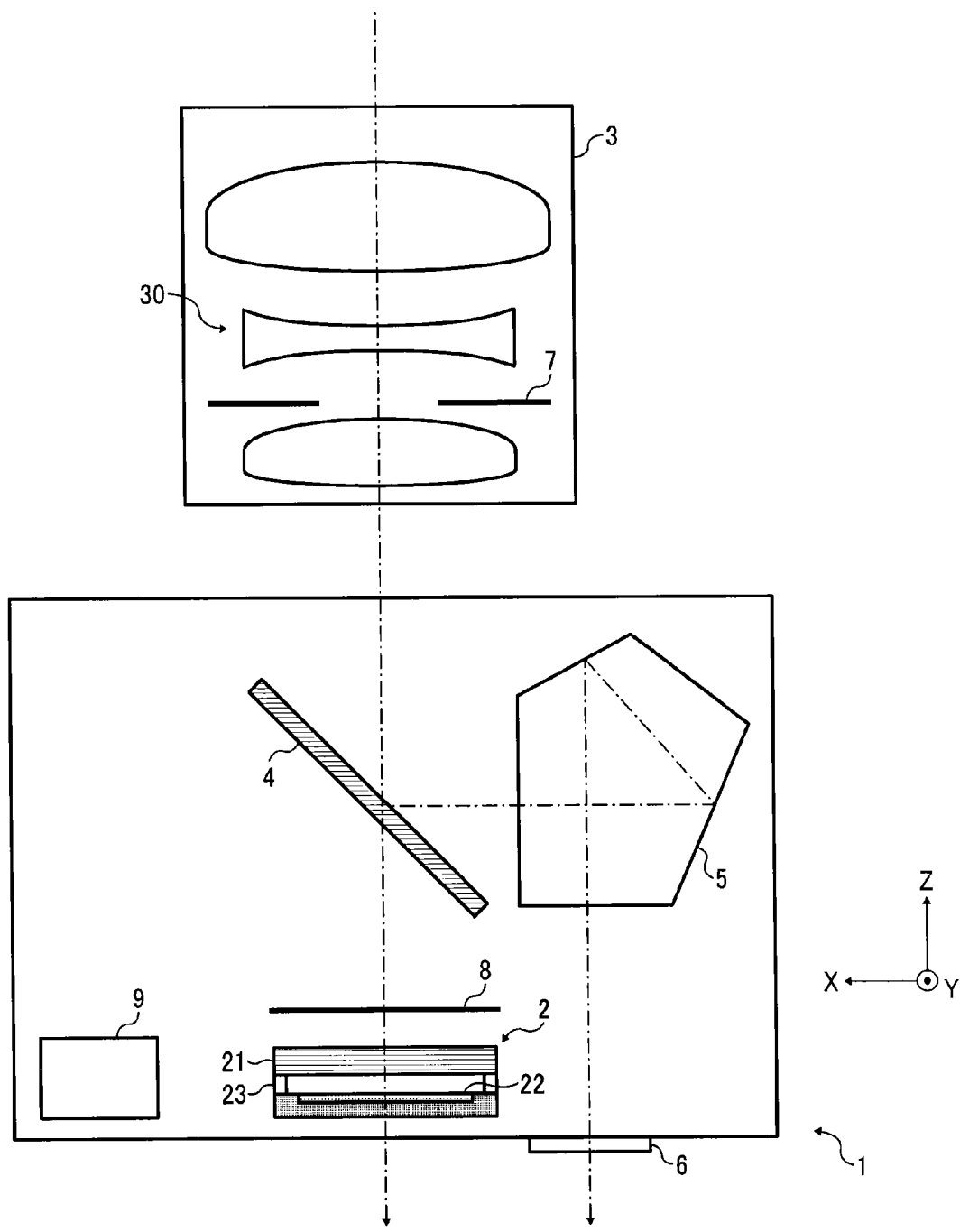
FIG. 1 illustrates a schematic diagram of an imaging apparatus and an optical modulator element according to an embodiment.

A schematic diagram of an imaging apparatus according to one embodiment of the present invention is shown in FIG. 1. The imaging apparatus 1 may include an imaging module 2 which obtains an image, an imaging optical system 3 which forms an image of incident light flux and emits light flux to the imaging module 2, and a mirror 4 which selects an optical path of light flux from the imaging optical system 3. Also, the imaging apparatus 1 may include a finder 6 which checks a view field, a light deflection element 5 (such as a prism which deflects light from the mirror 4 to the finder 6), a shutter 8 which adjusts an exposure time, a controller 9 which controls these members.

The above structures besides the imaging module 2 are almost the same as a common digital single lens reflex camera. It may be allowed to use a liquid crystal monitor instead of the finder 6 and the mirror like a single lens reflex camera without mirror.

As shown in FIG. 1, −Z direction is a direction in which light flux enters the imaging module 2, Y direction is a direction perpendicular to Z direction and plane of paper, X direction is a direction perpendicular to the Y direction. Although the Z direction may be aligned with the upward vertical direction in one embodiment, the Z direction may be changed based on an arrangement direction of the imaging apparatus 1.

The imaging module 2 may have an optical modulator element 21 which transmits incident light flux, adds a spatial modulation to light flux, and then emits it. The imaging module 2 may also have the imaging element 22 which receives a spatially modulated light flux as image information.

In the imaging module 2, the optical modulator element 21 and the imaging element 22 may be electrically connected with wiring which is not shown in the figures.

The optical modulator element 21 may be a transmission type spatial optical modulator element using an electro-wetting effect.

Figure 2:
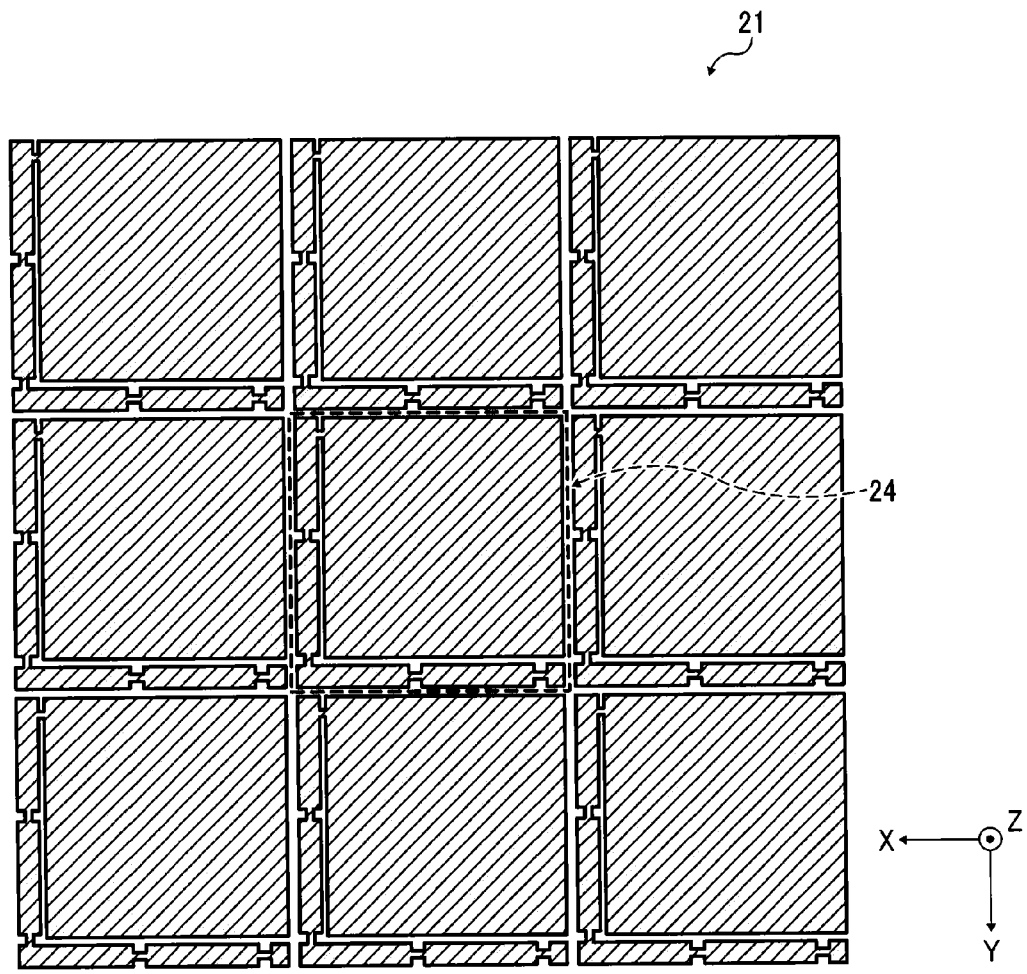
FIG. 2 illustrates a schematic diagram of an optical modulator element according to an embodiment.

As shown in FIG. 2, the optical modulator element 21 may have a plurality of cells 24 which are arranged periodically on a two-dimensional plane. The cell 24 may be an optical modulation pixel which is a minimum unit capable of controlling transmittance.

Figure 3A:
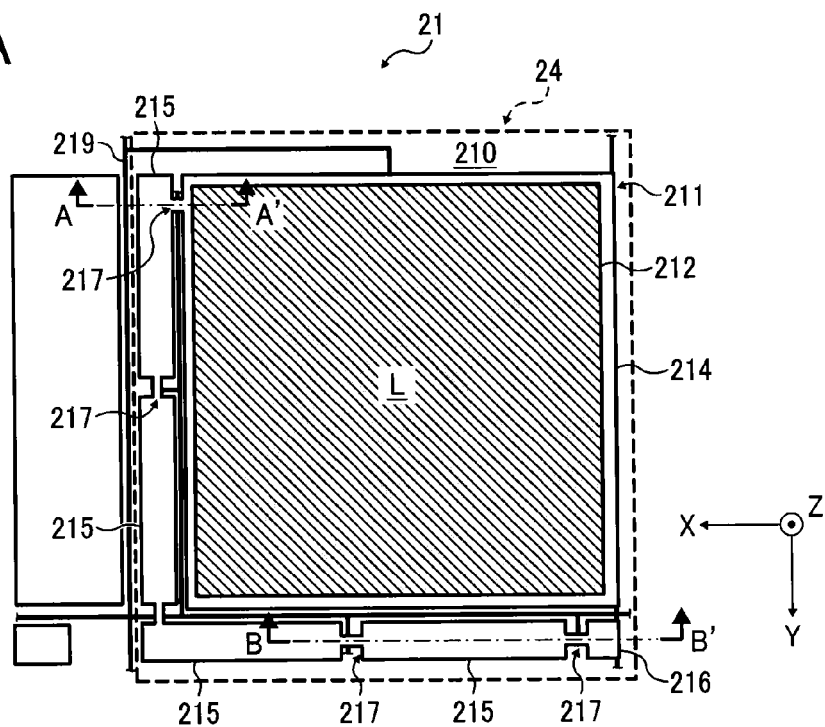
FIGS. 3A-3C illustrate enlarged views of a pixel part of an optical modulator element according to an embodiment.
Figure 3B:
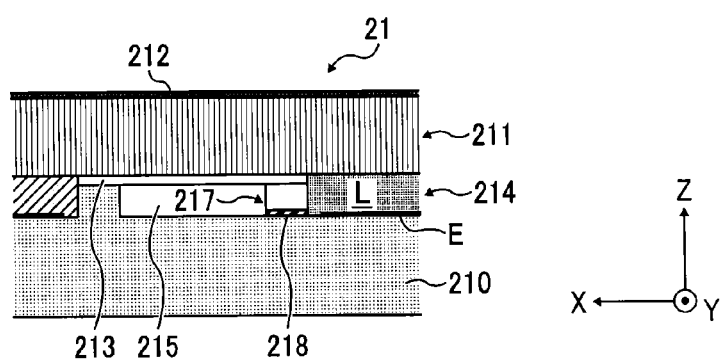
Figure 3C:
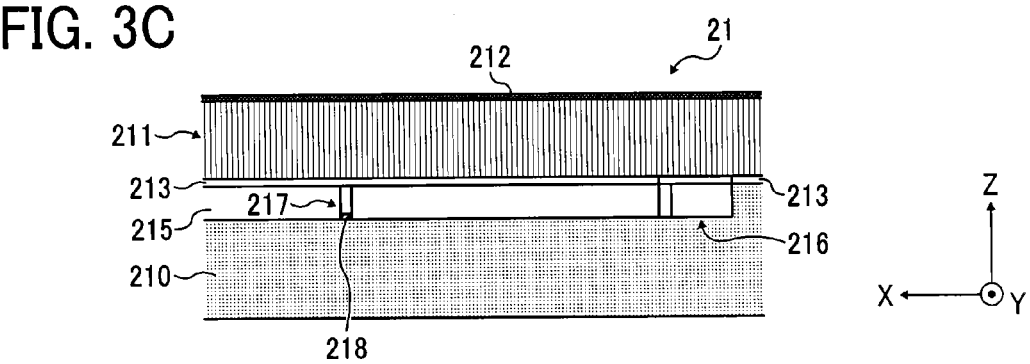

Each cell 24 has similar structure. FIGS. 3A, 3B, and 3C show one cell 24 respectively. As shown in FIG. 3A, the optical modulator element 21 may have a liquid L, an optical modulation layer 211 which has a fine-hole structure into which the liquid L flows. The amount of liquid L may increase or decrease in the fine-hole structure (the optical modulation layer 211). Furthermore, the optical modulator element 21 has a first liquid reservoir 214 which stores the liquid L to be propelled into the optical modulation layer 211. The first liquid reservoir 214 may be positioned below the optical modulation layer 211.

As shown in FIG. 3B, the optical modulator element 21 may have a wet electrode 212 which is positioned on an upper inner wall of the hole structure of the optical modulation layer 211, and a spacer 213 which is positioned below the optical modulation layer 211.

Moreover, the optical modulator element 21 may have a plurality of second liquid reservoirs 215 which stores the liquid L to be propelled into the first liquid reservoir 214. The plurality of second liquid reservoirs 215 are positioned to the side of the first liquid reservoir 214.

The optical modulator element 21 may have a transparent supporting base 210 which forms the first liquid reservoir 214 and the second liquid reservoirs 215.

The optical modulator element 21 may have a ventilation structure 216 for transferring gas between the optical modulation layer 211 and the second liquid reservoirs 215.

The optical modulator element 21 may have an electric wiring 219 which connects the wet electrode 212 or each second liquid reservoir 215 and the controller 9 respectively.

The optical modulator element 21 changes transmittance in the respective positions of the cell 24 using controller 9, and makes a coded aperture pattern (a mosaic pattern) which adds a spatial modulation to incident light flux.

The supporting base 210 may be made by performing optical lithography on a $SiO_2$ transparent base. Not only $SiO_2$ but also other transparent resin such as PDMS (Poly Dimethyl Siloxane) may also be used as materials for the supporting base 210. Electron beam lithography or the like may be used as a processing method of the supporting base 210.

In an aspect of one embodiment, a plurality of fine hole structures are formed along the Z direction in the optical modulation layer 211. It may be desirable to use a material similar to the material of the supporting base 210.

The wet electrode 212 may change a wettability at interface between the liquid L and an inner wall of the hole structure electrically using an electro-wetting effect. By applying a voltage to the wet electrode 212, the inner wall of the hole structure of the optical modulation layer 211 changes into hydrophilic property.

Transparent electrode material such as indium tin oxide (ITO), zinc oxide (ZnO) is preferably used for the wet electrode 212 to obtain a high transmittance. Metallic thin film made of gold (Au) or the like, may be used for the wet electrode 212.

The liquid L is a fluid whose refractive index is adjusted so that the optical modulation layer 211 becomes transparent when the optical modulation layer 211 is filled with the liquid L. For example, the refractive indexes of a material for the supporting base 210 and a material for the optical modulation layer 211 are the same or nearly the same as the refractive index of the liquid L. The liquid L has a function as an a refractive index matching member by flowing into the hole structure of the optical modulation layer 211. The liquid L is not necessarily a liquid, material such as sol-gel which has both properties of liquid and a refractive index matching member may be used instead of liquid.

The spacer 213 may be a transparent plate member to separate the optical modulation layer 211 and the second liquid reservoirs 215. The spacer 213 may prevent a movement of the liquid L between the optical modulation layer 211 and the second liquid reservoirs 215. It is preferable that a transparent material such as $SiO_2$ is used for material of the spacer 213.

As shown in FIG. 3, the first liquid reservoir 214 may be formed below the hole structure of the optical modulation layer 211 and on the upper part of the supporting base 210. The first liquid reservoir 214 may be a liquid reservoir whose shape is a recessed groove which is a cube-shape or a cuboid-shape. The first liquid reservoir 214 may have a function such as storing the liquid L. The first liquid reservoir 214 has a reference electrode E on the bottom of the first liquid reservoir 214. The reference electrode E is used as a reference electrode when a voltage is applied between the liquid L and the wet electrode 212.

Each second liquid reservoir 215 may be arranged along an outer periphery of the first liquid reservoir 214, respectively. The shape of each second liquid reservoir 215 may be a recessed groove which is a cube-shape or a cuboid-shape. The spacer 213 may be arranged as a lid above each second liquid reservoir 215. Each second liquid reservoir 215 and the optical modulation layer 211 may be separated by the spacer 213. Each second liquid reservoir 215 may be sealed to prevent the liquid L from moving directly between each second liquid reservoir 215 and the optical modulation layer 211.

Flow passage of the liquid L may be formed by connecting a plurality of the second liquid reservoirs 215 and the first liquid reservoir 214 in series. Provided that the first liquid reservoir 214 side of the flow passage is an upper stream, a ventilation structure 216 (which may be an air vent) is arranged in the second liquid reservoir 215 at the downstream end. In the second liquid reservoir 215 at the downstream end, the ventilation structure 216 may be located the downstream side end which is a side opposite to the first liquid reservoir 214.

Each second liquid reservoir 215 has a movement control part 217 that is at least one end closer to the first liquid reservoir 214, respectively. The movement control part 217 may have a coupling part and also may have a valve control electrode to control the movement of the liquid L from the first liquid reservoir 214 side.

As shown in FIG. 3B and FIG. 3C, the movement control part 217 may have a valve control electrode 218 which is similar to the wet electrode 212, is formed on an interior wall of rectangular tube formed of the second liquid reservoir 215 and the spacer 213. The width of the movement control part 217 is smaller than that of the second liquid reservoir 215 in X and Y direction. It may be a constriction structure (i.e., a valve structure). The width of the movement control part 217 may be smaller than that of the second liquid reservoir 215 in either X or Y direction.

The electric wiring 219 is connected with all cells arranged in X and Y directions in the optical modulator element 21. The electric wiring 219 may constitute an active matrix switch.

An upper-layer side electric wiring 219 in the upper side in the Z direction is connected with a plurality of cells 24 arranged in X direction on the optical modulator element 21, and a lower-layer side electric wiring 219 in the lower side in the Z direction is connected with a plurality of cells 24 arranged in Y direction on the optical modulator element 21.

Metallic material such as Au is preferably used for the electric wiring 219 from the point of view of controlling hydrophilicity-hydrophobicity using an electro-wetting effect.

Transparency material is preferably used for all components of the optical modulator element 21 except for the electric wiring 219 and the ventilation structure 216. By this construction, the cell 24 may function as a transparent body with transparency having a predetermined aperture ratio.

CCD (Charge Coupled Device) image sensor may be used for the imaging element 22 as a photo detector array with an imaging surface which receives light flux added a spatial modulation by the optical modulator element 21 as image information. A photo detector array 28 may be arranged on the imaging element 22. The photo detector array 28 may be formed by arranging a plurality of photodiodes which are light detectors and light receivers. The information such as light intensity of light flux incident on the imaging surface may be converted to an electric signal. Though CCD is used in one embodiment, an image sensor such as CMOS (Complementary Metal-Oxide Semiconductor) can be used in order to obtain an image information.

A gap forming member 23 which may be arranged between the optical modulator element 21 and the imaging element 22 forms a predetermined gap.

The optical modulator element 21 and the imaging element 22 may be fixed in parallel with a predetermined gap using the gap forming member 23.

A fixing member such as screw or an adhesion material may be used for the gap forming member 23. The optical modulator element 21 and the imaging element 22 may be integrally molded in one embodiment. The gap forming member 23 makes a gap of approximately 2 mm or smaller between the optical modulator element 21 and the imaging element 22. The gap forming member 23 preferably makes a gap of 1 mm or smaller between the optical modulator element 21 and the imaging element 22.

An angle information of an image formed on the imaging element 22 with the imaging optical system 3 is obtained by pattern of the optical modulator element 21 and location information of light receiver of the imaging element 22.

The imaging optical system 3 may have an imaging lens group 30 which has at least one lens that is arranged to form an image on the imaging element 22. The imaging optical system 3 also may have a stop 7 to adjust an incident light quantity into the optical modulator element 21.

The imaging optical system 3 may be arranged to form an image of light flux made incident to the imaging apparatus 1 on the imaging element 22. In the other words, there is an image plane of the imaging optical system 3 on the imaging element 22.

Figure 4A:
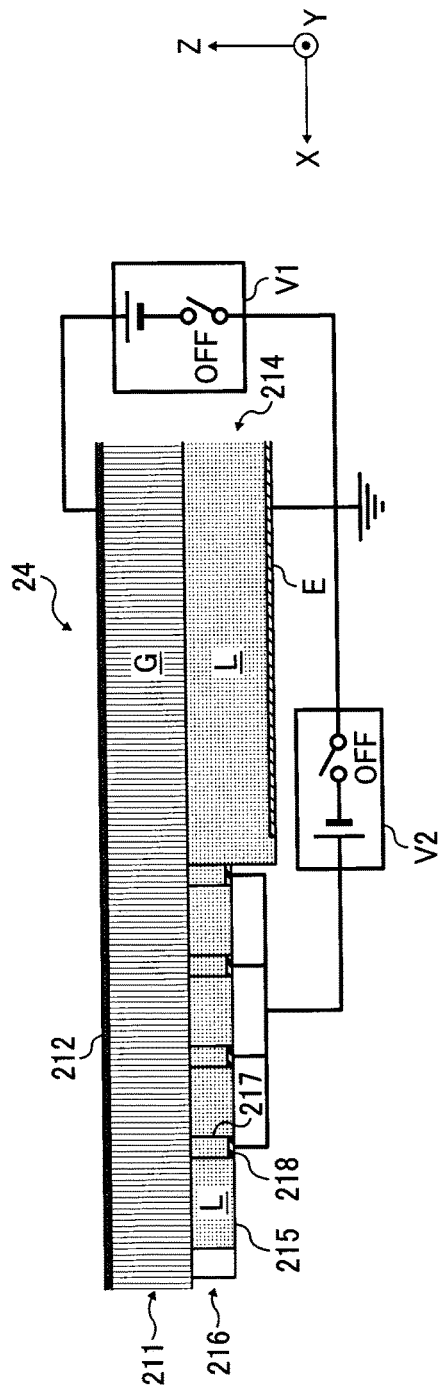

As shown in FIG. 4A, the controller 9 may have a wet electrode power source V1 to apply voltage to the wet electrode 212. The controller 9 may also have a valve control electrode power source V2 to apply voltage to the valve control electrode 218.

The controller 9 can function as a spatial light modulation pattern generator, a decoding processor which converts light flux transmitted through the optical modulator element 21 to image information, an image property analyzer which separates an imaging field angle based on the image information obtained and obtains an image including spatial information such as a distance, a direction or the like. The image including spatial information includes an image generated by light flux of the particular angle or a distance image in which respective colors are allocated to respective distance, for example. The image property analyzer includes a spatial information analysis and an image reconstruction.

The following describes a method for obtaining an image information using the imaging apparatus 1. In one embodiment, a light flux enters the imaging apparatus 1 and an image of the light flux is formed on the imaging element 22 by the imaging lens group 30, a light quantity is adjusted by passing through the stop 7. When not photographing, the light flux passing through the imaging optical system 3 is reflected by the mirror 4 and proceeds to the finder 6 through the light deflection element 5. When photographing, the mirror 4 moves not to interfere the light flux from the imaging optical system 3 and the light proceeds to the imaging module 2. In this way, the mirror 4 is a movable mirror and the mirror 4 is operated as an optical path selector.

The light flux made incident into the optical modulator element 21 is added a spatial modulation by the optical modulator element 21.

The controller 9 (as an element driver) may control a transmittance distribution of the optical modulator element 21 using a spatial transmittance distribution obtained by overlapping different sine waveforms with a plurality of periods.

The optical modulator element 21 may change a transmittance of each cell 24 on the element in accordance with an electrical signal, in other words, in accordance with a periodic modulation signal from the controller 9 (as an element driver), and makes coded aperture pattern.

The optical modulator element 21 may change periodically a transmittance of each cell 24 on the element, and may add a spatial modulation to the light flux passing through the optical modulator element 21.

At that time, the controller 9 (as an element driver) functions as a spatial light modulation pattern generator.

Light flux added with a spatial modulation is detected by the imaging element 22 and recognized as an image information. The frequencies of modulation of image between a light from an object positioned on the optical axis (a principal ray angle is zero-degree) and a light from an object positioned outside the optical axis (a particular degrees) may be different. By image processing for the difference of the frequencies of modulation (conversion from two dimensions to four dimensions, and four-dimensional Fourier transformation), an angle information of light flux (i.e. a direction component information of the light flux) is obtained.

The controller 9 (as a decoding processor) removes a spatial modulation from an image information thus obtained, and reconstructs an image, and then an image including spatial information such as a distance, or the like is obtained.

In general, a spatial frequency of an image itself exists in a low frequency region. When high frequency modulation signal (a plurality of sine waves in X and Y direction) is superimposed on such an image, a frequency distribution of the same profile as a spatial frequency distribution of the image itself may be formed with the modulation frequency as a center. This process is called a duplication. It is mathematically expressed using a convolution integral of a delta function of frequency modulation position and a frequency distribution of the image itself.

When a coded aperture pattern is formed with a spatial transmittance distribution, spectral distribution of finite spatial frequency band of an image is duplicated at spatial frequency position corresponding to period of the sine wave.

Many duplications of spatial frequency spectral distribution of subject are provided on the axis of spatial frequency. Frequency information of angular component is mixed with a position information of spatial frequency image (X-Y plane of the spatial frequency) of the photographed image based on an amplitude of the frequency of the sine wave. With respect to these information, separation of an imaging field angle becomes possible by converting to four dimensions information of a spatial information and an angular information.

Controlling and keeping precisely a transmittance of the cell 24 in multiple values state is important to separate precisely an imaging field angle. As miniaturization of an imaging device such as a digital camera is strongly requested, it may not favorable that the transmittance of the cell 24 is controlled at multiple values using complicated electronic circuit.

Therefore, in one embodiment, the transmittance of the cell 24 is controlled at multiple values as shown FIG. 4A to FIG. 4D.

An initial state of the optical modulator element 21 is shown in FIG. 4A. The liquid L is not propelled into the optical modulation layer 211. The total amount of the liquid L is kept in the first liquid reservoir 214 and the second liquid reservoirs 215.

Both the wet electrode power source V1 and the valve control electrode power source V2 are OFF. Voltage is not applied to both the wet electrode power source V1 and the valve control electrode power source V2 in this state.

At this time, a gas G such as an air exists inside the hole structure of the optical modulation layer 211. As a refractive index matching of the optical modulation layer 211 is not performed, diffused reflection occurs at interface between the gas G and a solid substance such as $SiO_2$ constituting an inner wall of the hole structure. Therefore, a transmittance of the optical modulation layer 211 may be low.

Figure 4B:
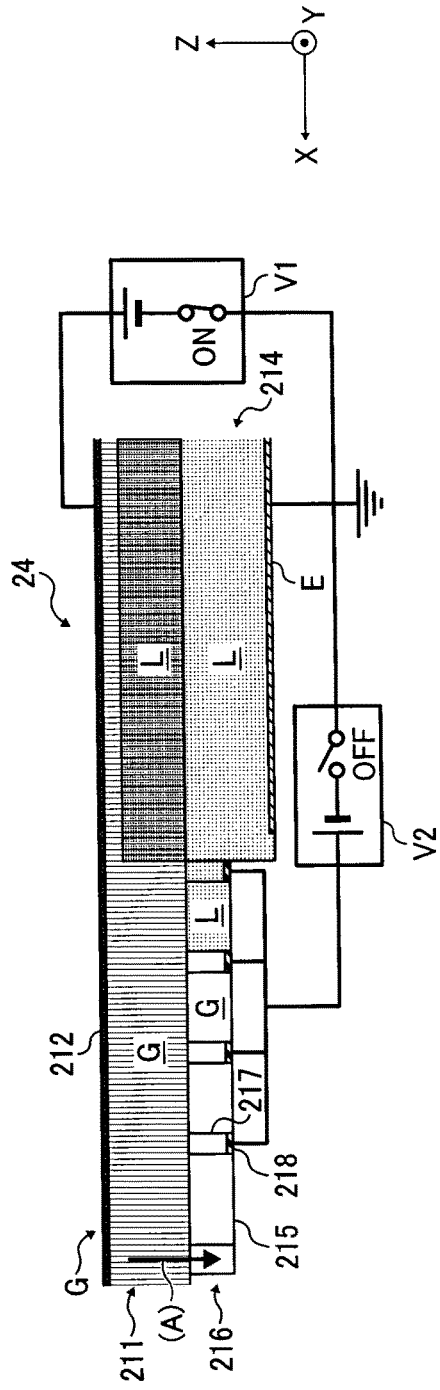

Next, a suction state of the optical modulator element 21 is shown in FIG. 4B. The wet electrode power source V1 is ON and the valve control electrode power source V2 is OFF.

As the wet electrode power source V1 is ON, a voltage is applied to the wet electrode 212, and then the inner wall of the hole structure changes into hydrophilic property.

As the hole structure of the optical modulation layer 211 is a fine capillary, when the inner wall of the hole structure changes into hydrophilic property, suction force acts on the liquid L by capillarity phenomenon, and the liquid L propels inside the optical modulation layer 211. A liquid surface of the liquid L which is an interface between the liquid L and the gas G in the optical modulation layer 211 rises.

The gas G exists inside of the hole structure of the optical modulation layer 211 in the initial state. The gas G moves from the optical modulation layer 211 to the second liquid reservoirs 215 through the ventilation structure 216 in "A direction" shown in FIG. 4B in the suction state.

As mentioned above, the liquid L is a liquid whose refractive index may be adjusted so that the optical modulation layer 211 becomes transparent when the optical modulation layer 211 is filled with the liquid L. When the liquid L moves into the hole structure of the optical modulation layer 211, volume of the region having a refractive index difference decreases, and then the refractive index matching is performed. Therefore, scattering light occurring at interface between the gas G and the solid substance such as $SiO_2$ constituting an inner wall of the hole structure decreases, and then the transmittance increases.

The transmittance of the optical modulator element 21 is determined based on an amount of the liquid L propelled into the optical modulation layer 211, in the other words, a liquid level height of the liquid L.

As shown in FIG. 4B, the width of the movement control part 217 is smaller than that of the second liquid reservoir 215. For preventing suction by capillarity phenomenon in X direction, the valve control electrode power source V2 is OFF. As the valve control electrode power source V2 is OFF, the movement control part 217 is hydrophobic.

Because the diameter of the movement control part 217 is very different from the diameter of the hole structure, the suction force of the hole structure acting on the liquid L by capillarity phenomenon is adequately large. Therefore, the movement control part 217 does not prevent movement of the liquid L.

In this way, the valve control electrode power source V2 is set so as not to prevent -X direction movement of the liquid in the suction state. The -X direction is upstream direction of a flow passage of the liquid L.

A mechanical valve or an electromagnetic valve may be used for the movement control part 217 to the extent of the purpose of controlling the movement of the liquid L. For example, when the liquid L passing through the movement control part 217 is controlled by a valve, the movement control part 217 may be open by making the valve control electrode power source V2 be ON so as not to prevent movement of the liquid L.

The optical modulator element 21 may control an interface position of the liquid L at multiple values without a switching electronic component such as transistor or the like. FIG. 4C illustrates a holding state where the interface position at a raised position in the suction state is maintained.

In the holding state, both the wet electrode power source V1 and the valve control electrode power source V2 are OFF. At this time, the inner wall of the hole structure of the optical modulation layer 211 changes into hydrophobic property, and then an ejection force F1 acts on the liquid L so that F1 pushes the liquid L in the downstream direction (X direction) of the flow passage. However, as voltage is not applied to the valve control electrode 218 and the movement control part 217 is hydrophobic, the movement of the liquid L may be limited or suppressed. A retaining force F2 suppressing the movement of the liquid L acts to cancel the ejection force F1, and then the movement of the liquid L is suppressed.

At this time, the interface position of the liquid L may be maintained in a state such that voltage is not applied to both the wet electrode 212 and the valve control electrode 218. In the other words, the interface position of the liquid L is maintained without power consumption.

A height of the interface of the liquid L is highest when the liquid L is not propelled into any second liquid reservoirs 215. A height of the interface of the liquid L is lowest when the liquid L is propelled into all second liquid reservoirs 215.

In the holding state, a discrete state is maintained by multistage structural volume of the second liquid reservoirs 215 at any height of the interface of the liquid L. In other words, transmittance can be maintained discretely by forming as many second liquid reservoirs 215 as multiple-value number desired. In this way, the interface position (liquid surface position) of the liquid L inside of the optical modulation layer 211 can be controlled and maintained at discrete multiple values by forming a plurality of the second liquid reservoirs 215.

By such a construction, in transmission type optical modulator, the height of the liquid surface of the liquid L can be maintained at multiple values without a complicated electronic circuit while saving power and keeping a high aperture ratio and polarization independency.

While a plurality of the second liquid reservoirs 215 are arranged along the flow passage in series in FIG. 4A to FIG. 4D, a plurality of the second liquid reservoirs 215 can be arranged in parallel and each second liquid reservoir 215 can be connected to the first liquid reservoir 214 directly. In this case, the height of the interface of the liquid L can be determined by the number of the second liquid reservoirs 215 which are filled with the liquid L. This aspect of the one embodiment is concretely explained below.

The plurality of the second liquid reservoirs 215 are provided adjacent to the first liquid reservoir 214 and are directly connected to the first liquid reservoir 214, respectively.

The movement of the liquid L from the first liquid reservoir 214 to each second liquid reservoir 215 may be controlled by the movement control part 217.

The interface position of the liquid L inside the optical modulation layer 211 may be determined by a volume of the liquid L in the optical modulation layer 211. As a total volume of the liquid L in the optical modulator element 21 may be fixed, the volume of the liquid L in the optical modulation layer 211 may be obtained by subtracting a total volume of the liquid L which is filled in the second liquid reservoirs 215 from the total volume of the liquid L in the optical modulator element 21.

By such a construction, transmittance of the optical modulator element 21 may be maintained in a discrete state by multistage structural volume of the second liquid reservoirs 215. Transmittance can be maintained discretely by forming as many second liquid reservoirs 215 as multiple-value number desired.

Finally, an ejection state where the liquid L is ejected from the optical modulation layer 211 and the height of the liquid L is lowered is shown in FIG. 4D. In the ejection state, the wet electrode power source V1 is OFF and the valve control electrode power source V2 is ON.

As the movement control part 217 changes into hydrophilic property, the liquid L moves toward a downstream of the flow passage in X direction by the ejection force F1 generating by a hydrophobic property of the inner wall of the hole structure of the optical modulation layer 211. At this time, the gas G existing in the second liquid reservoirs 215 in the suction state moves to the optical modulation layer 211 through the ventilation structure 216 in "B" direction as shown in FIG. 4D.

Performing such a control can return the state of the optical modulator element 21 to the initial state as shown in the FIG. 4A.

In FIG. 4A to FIG. 4D, a plurality of the second liquid reservoirs 215 are arranged along the flow passage in series from the first liquid reservoir 214. All valve control electrodes 218 may be connected to the electric wiring 219. Voltage may be applied to all valve control electrodes 218 using the electric wirings 219 as one wiring. In the other words, voltage to a plurality of the valve control electrodes 218 is controlled so that the voltage may be applied to the plurality of the valve control electrodes 218 in a batch.

In such a batch control, the voltage is applied in pulse in shorter time than a liquid L filling time of a second liquid reservoir 215 which is a second liquid reservoir 215 on downstream side of the flow passage is arranged on the most first liquid reservoir 214 side in the second liquid reservoirs 215 not yet filled with the liquid L. Such a construction can fill the second liquid reservoirs 215 arranged in series multistage, one by one.

Figure 5A:
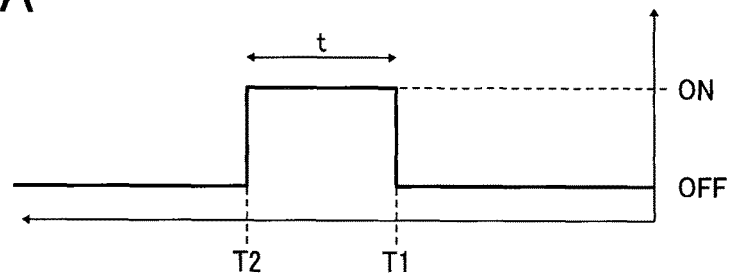
FIGS. 5A-5C illustrate schematic diagrams showing another operation of an optical modulator element according to an embodiment.

In such a batch control, the case in which voltage is applied to the valve control electrode power source V2 in pulse as shown in FIG. 5A is explained below. The horizontal axis of FIG. 5A indicates time and the vertical axis of FIG. 5A indicates voltage. The valve control electrode power source V2 is ON and voltage is applied to the valve control electrodes 218 during a period from the impression starting time T1 to the impression finishing time T2.

Figure 5B:
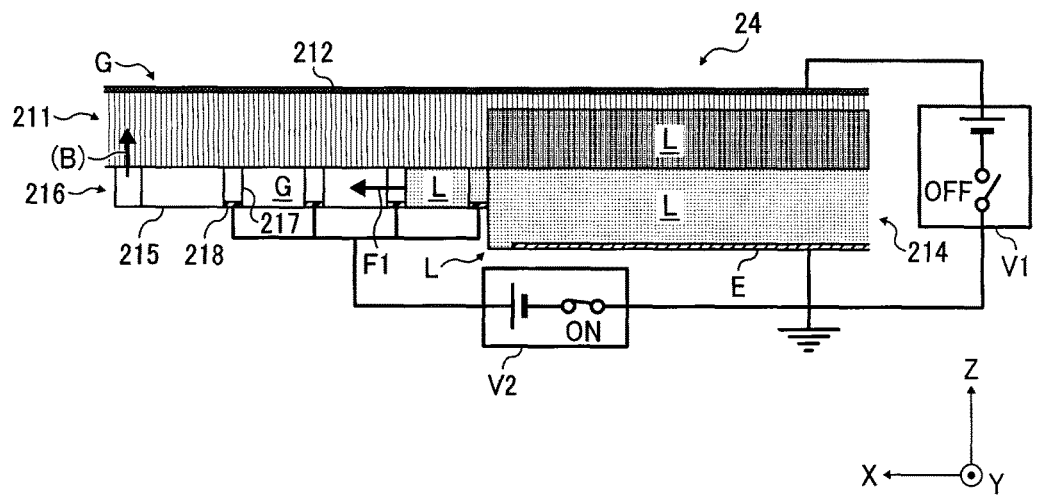

A state of the optical modulator element 21 at the impression starting time T1 is shown in the FIG. 5B. As voltage is applied to the valve control electrodes 218 and the movement control part 217 is hydrophilic at the impression starting time T1, the ejection force F1 acts on the liquid L in X direction, and then the liquid L moves toward X direction side.

In such a batch control, when all movement control parts 217 change to hydrophilic, the liquid L is propelled into only the second liquid reservoir 215 adjacent to a second liquid reservoir 215 filled with the liquid L as each second liquid reservoir 215 is connected in series. The time t for filling the second liquid reservoir 215 is constant. The time t can be previously obtainable by designing. The controller 9 may control the impression starting time T1 and the impression finishing time T2 so as to be t=T2−T1.

Figure 5C:
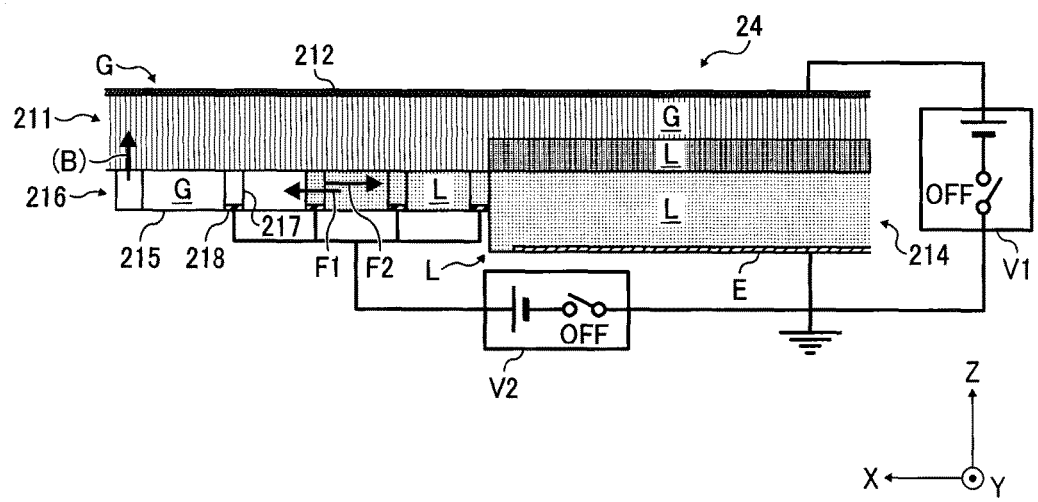

A state of the optical modulator element 21 at the impression starting time T2 is shown in the FIG. 5C in like manner. The valve control electrode power source V2 is OFF and the movement control part 217 change to hydrophobic property at the impression starting time T2. At this time, the retaining force F2 acts on the liquid L to cancel the ejection force F1, and then the movement of the liquid L is suppressed like the holding state shown in FIG. 4D.

The controller 9 may control the valve control electrode power source V2 so as to perform such an operation and fills the second liquid reservoirs 215 arranged in series multistage, one by one, in the batch control.

Such a construction can simplify a control and reduce the number of components. Therefore, the height of the liquid L can be maintain at multiple values more efficiently while saving power.

The valve control electrode power sources V2 may be provided in one to one with the valve control electrodes 218 independently, and then voltage may be applied to each valve control electrodes 218 respectively. Alternatively, voltage may be applied by ON-OFF of a switch independently.

In one embodiment, the height of the liquid surface (the interface position) of the liquid L can be maintained at multiple values without a complicated electronic circuit while saving power as a plurality of the second liquid reservoirs 215 are connected in series.

In one embodiment, the height of the liquid surface of the liquid L can be maintained at multiple values and an aperture ratio of the optical modulator element 21 can be enhanced without a complicated electronic circuit while saving power as each second liquid reservoir 215 is arranged along an outer periphery of the first liquid reservoir 214.

In the one embodiment, the first liquid reservoir 214 is positioned below the hole structure of the optical modulation layer 211.

By such a construction, the liquid L moves from the inside of the optical modulation layer 211 to the first liquid reservoir 214 using the gravity and the ejection force in the ejection state. As such, it reduces the amount of electricity consumption to return to the initial state. Therefore, the height of the liquid surface of the liquid L can be maintained at multiple values while saving power.

In one embodiment, the optical modulator element 21 has the ventilation structure 216 which is connected to the hole structure of the optical modulation layer 211 and the second liquid reservoir 215. The gas G moves between the hole structure and the second liquid reservoirs 215 when the amount of the liquid L in the optical modulation layer 211 increases or decreases.

By such a construction, the gas G moves when the liquid L moves, and then the variation of the pressure of the gas G by the movement of the liquid L is suppressed or prevented. Therefore, the height of the liquid surface of the liquid L can be maintained efficiently at multiple values.

Figure 6:
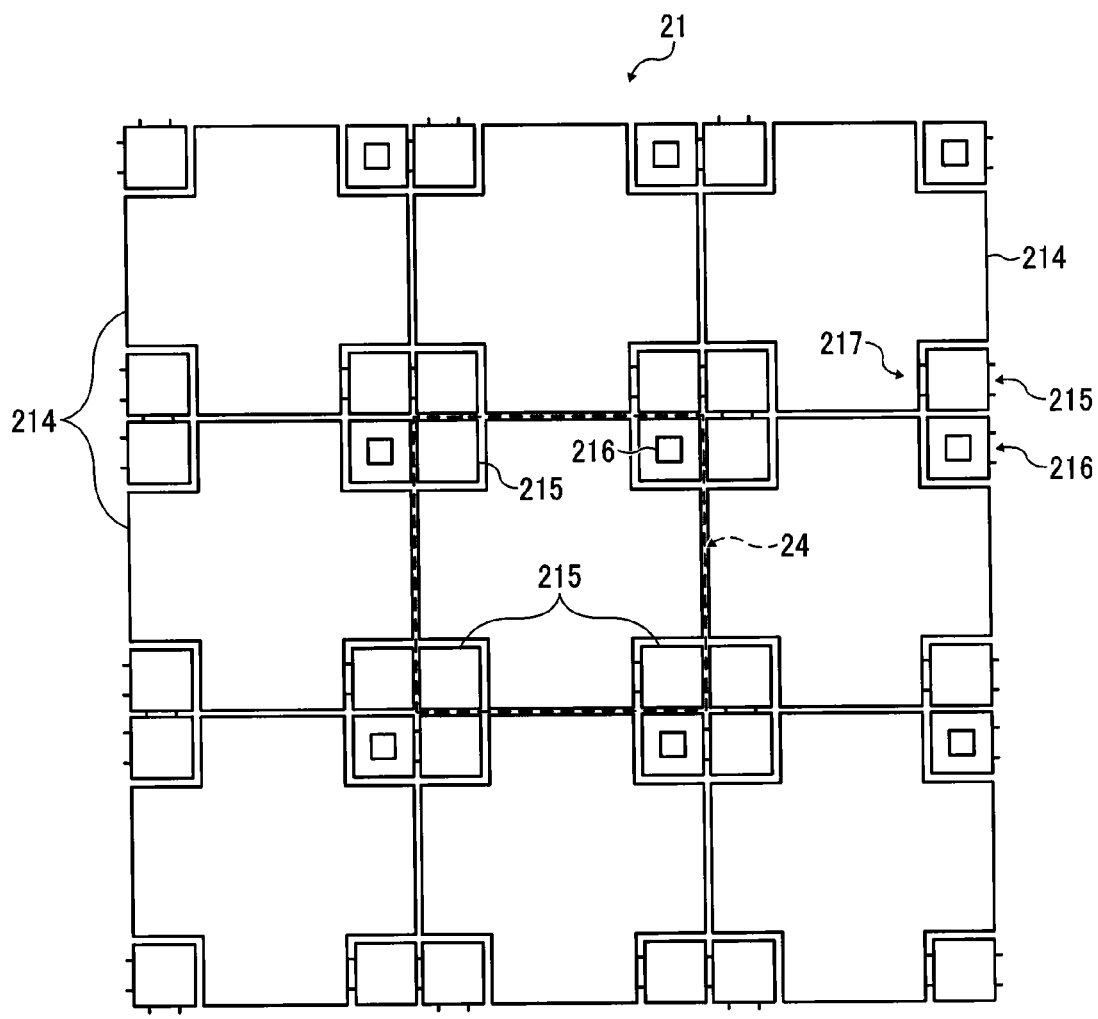
FIG. 6 illustrates a schematic diagram of a modified example of an optical modulator element according to an embodiment.
Figure 7:
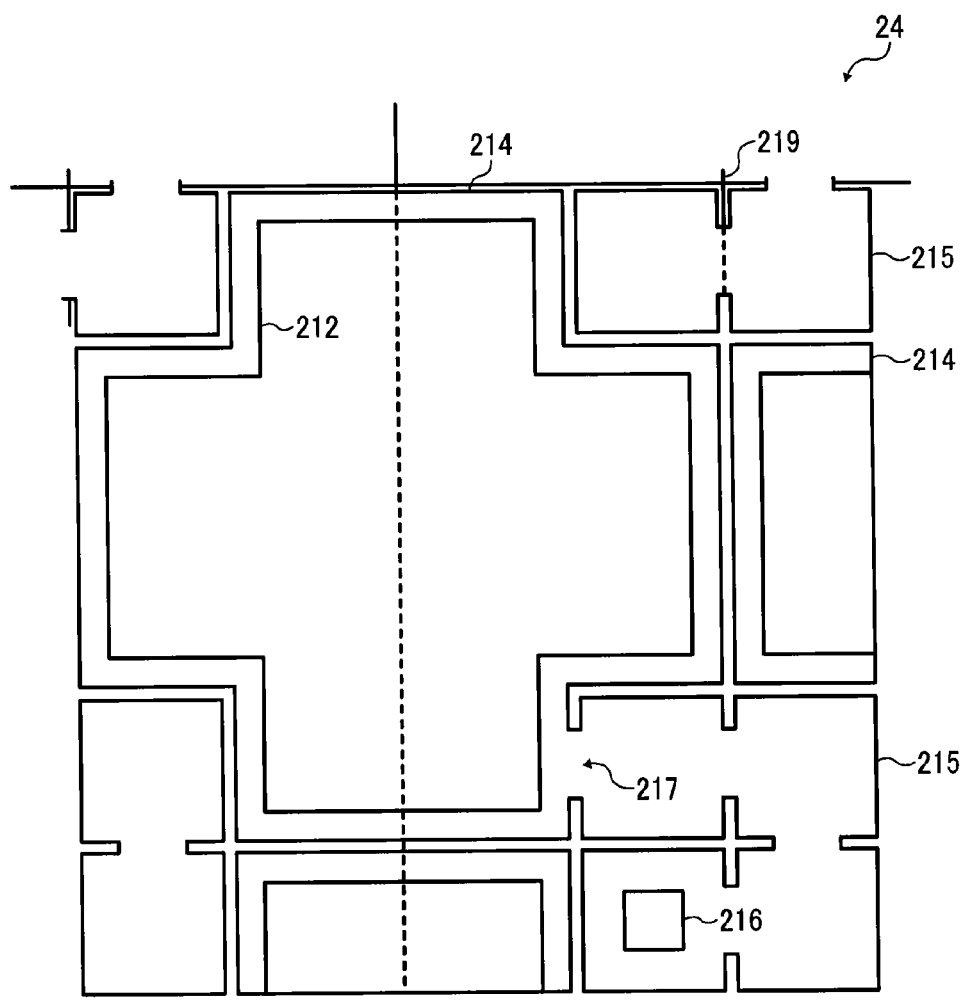
FIG. 7 illustrates an enlarged view of a pixel part of a modified example of an optical modulator element according to an embodiment.

A modified example is shown in FIG. 6 and FIG. 7. In FIG. 6 and FIG. 7, the optical modulator element 21 has a plurality of the first liquid reservoirs 214 arranged periodically. A shape of the first liquid reservoir 214 is a shape forming by crossing of cuboids at the center thereof. The shape may be a cruciform shape.

A plurality of the second liquid reservoirs 215 are respectively arranged in gaps forming when arranging a plurality of adjacent first liquid reservoirs 214 as shown in FIG. 6.

The second liquid reservoirs 215 are arranged so as to fill quadrate gaps formed by corners of cruciform shape first liquid reservoirs 214 adjacent to each other.

By such a construction, an effective area between adjacent cells 24 expands and an aperture ratio of the optical modulator element 21 can be enhanced more. Furthermore, the height of the liquid surface of the liquid L can be maintained at multiple values without a complicated electronic circuit while saving power.

The other parts of this modified example are similar to the constitution explained using FIG. 1 to FIG. 5. Therefore, the explanation of the other parts is omitted.

Figure 8:
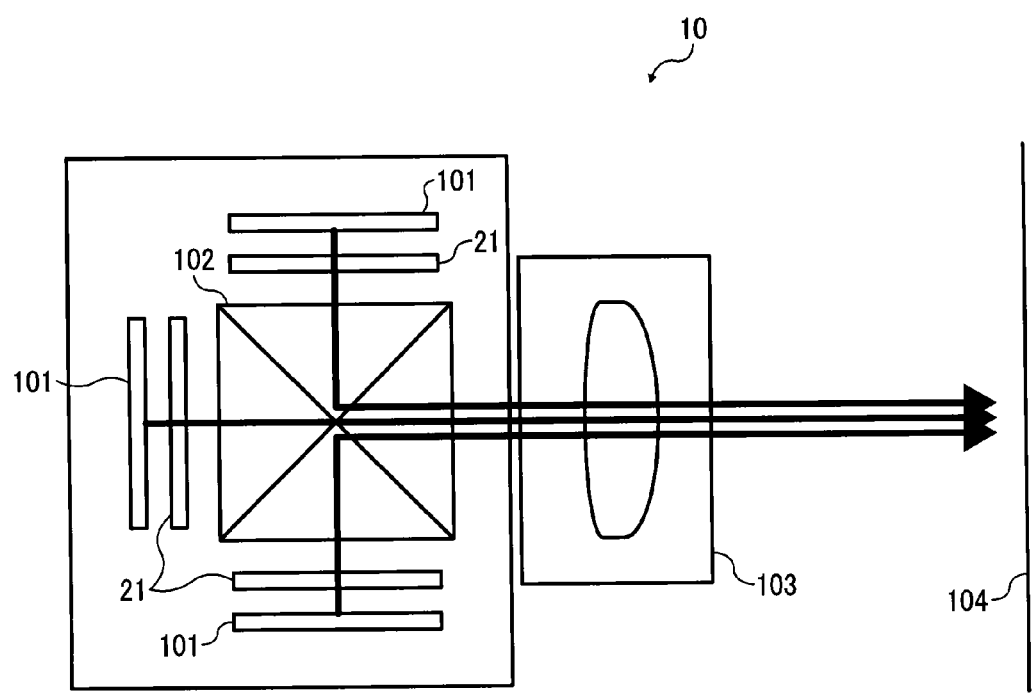
FIG. 8 illustrates a schematic diagram of an image projecting apparatus having an optical modulator element according to an embodiment.

An example of an image projecting apparatus 10 is illustrated in FIG. 8 as another embodiment.

The image projecting apparatus 10 shown in FIG. 8 may have the optical modulator element 21 (which is shown in FIG. 2 to FIG. 5) that is provided in an optical path in the image projecting apparatus 10

The image projecting apparatus 10 has a plurality of light sources 101 which emit light flux. Specifically, the image projecting apparatus 10 may have at least three light sources 101. Furthermore, the image projecting apparatus 10 has a plurality of the optical modulator elements 21 arranged near each light source 101, an image composition element 102 which composites light fluxes passing through each optical modulator element 21 and deflects light fluxes, and an imaging optical system 103.

A polarization plate or a polarization prism which are heretofore needed when using a liquid crystal type spatial optical modulator element becomes unnecessary by such a construction. Therefore, the number of components for optical system is reduced, and the image projecting apparatus 10 may be very small.

As explained above, a transmittance control of the optical modulator element 21 may utilize optical scattering phenomenon. Therefore, a wavelength dependency of the transmittance control is relatively weak. So it is preferable that independent LEDs emitting light of respective colors R, G, B are provided as light sources 101, each light corresponding to respective colors passes through different independent optical modulator elements 21 respectively, and then an image forming is performed by a dichroic cross prism as the image composition element 102.

In this way, as LED is used as light source 101, a lifespan of the light source 101 becomes longer and efficiency of energy of the image projecting apparatus 10 is enhanced.

A method in which white light source is used and color dividing are performed by dichroic mirror and a method in which LED emits light in time-division manner and a color separation is performed with color wheel and then image composition is performed may be employed.

An image composed in such a manner is image-formed by the imaging optical system 103 and projected to a screen 104.

As the optical modulator element 21 can maintain multivalued information discretely while saving power as described above, the image projecting apparatus 10 of this embodiment can project an image with extremely small power consumption.

By such a constitution, a small image projecting apparatus with extremely small power consumption is provided.

As a transmission type optical modulator element 21 having a high numerical aperture is employed, reflection optical system is unnecessary in this embodiment. It is different from the case where LCOS device is employed.

Therefore, the number of components for optical system is reduced, and a very small image projecting apparatus is provided.

Though various embodiments are explained above, the present disclosure is not limited to a particular embodiment. Within the meaning of this invention, various changes are possible.

For example, the imaging apparatus 1 may be a compact digital camera, a small camera mounted on a portable equipment or the like.

Though the image projecting apparatus 10 is a color image projecting apparatus with light sources that emit respective colors, the image projecting apparatus 10 may be a monochrome image projecting apparatus with one light source.

As set forth hereinabove, according to an embodiment, the optical modulator element can control an interface position between the support member and the liquid at multiple values without a complicated electronic circuitry.

The effects of the invention are not limited to the description in the embodiments.

What is claimed is:

1. An optical modulator device, comprising:
   a plurality of hole structures;
   a first liquid reservoir that stores a liquid to be propelled into the plurality of hole structures;
   a plurality of second liquid reservoirs that store a liquid to be propelled into and through the first liquid reservoir before being propelled into the plurality of hole structures; and
   a movement control part device that is arranged at at least one end of the plurality of second liquid reservoirs that is closest to the first liquid reservoir, and controls a movement of the liquid from the first liquid reservoir, the movement control part device being arranged within the plurality of second liquid reservoirs.

2. The optical modulator device according to claim 1, wherein the plurality of second liquid reservoirs are connected in series.

3. The optical modulator device according to claim 1, wherein each of the plurality of second liquid reservoirs is arranged along an outer periphery of the first liquid reservoir.

4. The optical modulator device according to claim 2, wherein each of the plurality of second liquid reservoirs is arranged along an outer periphery of the first liquid reservoir.

5. The optical modulator device according to claim 1, further comprising:
   a ventilation structure that is connected to at least one of the plurality of hole structures and a liquid reservoir of the plurality of second liquid reservoirs, and a gas moves between the at least one of the plurality of hole structures and the liquid reservoir of the plurality of second liquid reservoirs when an amount of liquid increases or decreases through the ventilation structure.

6. The optical modulator device according to claim 2, further comprising:
a ventilation structure that is connected to at least one of the plurality of hole structures and a liquid reservoir of the plurality of second liquid reservoirs, and
a gas moves between the at least one of the plurality of hole structures and the liquid reservoir of the plurality of second liquid reservoirs when an amount of liquid increases or decreases through the ventilation structure.

7. The optical modulator device according to claim 3, further comprising:
a ventilation structure that is connected to at least one of the plurality of hole structures and a liquid reservoir of the plurality of second liquid reservoirs, and
a gas moves between the at least one of the plurality of hole structures and the liquid reservoir of the plurality of second liquid reservoirs when an amount of liquid increases or decreases through the ventilation structure.

8. The optical modulator device according to claim 4, further comprising:
a ventilation structure that is connected to at least one of the plurality of hole structures and a liquid reservoir of the plurality of second liquid reservoirs, and
a gas moves between the at least one of the plurality of hole structures and the liquid reservoir of the plurality of second liquid reservoirs when an amount of liquid increases or decreases through the ventilation structure.

9. The optical modulator device according to claim 1, wherein the second liquid reservoirs are positioned to the side of the first liquid reservoir and wherein the first liquid reservoir is positioned below an optical modulation layer.

* * * * *